(12) United States Patent
Ramirez et al.

(10) Patent No.: US 6,661,566 B2
(45) Date of Patent: Dec. 9, 2003

(54) METHOD AND OPTICAL SWITCH FOR ALTERING AN ELECTROMAGNETIC ENERGY WAVE IN RESPONSE TO ACCELERATION FORCES

(75) Inventors: Ayax D. Ramirez, Chula Vista, CA (US); Stephen D. Russell, San Diego, CA (US); Peter M. Poirier, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 210 days.

(21) Appl. No.: 09/956,710

(22) Filed: Sep. 20, 2001

(65) Prior Publication Data

US 2003/0053746 A1 Mar. 20, 2003

(51) Int. Cl.⁷ .................................................. G02F 1/29
(52) U.S. Cl. .......................... 359/320; 385/23; 385/11; 385/16; 385/12
(58) Field of Search ............................. 385/23, 11, 16, 385/12; 359/320

(56) References Cited

U.S. PATENT DOCUMENTS

| | | | |
|---|---|---|---|
| 3,459,961 A | | 8/1969 | Ravas |
| 4,048,859 A | * | 9/1977 | Babcock ................... 73/514.27 |
| 4,450,351 A | | 5/1984 | Fraden |
| 4,544,408 A | | 10/1985 | Mosser et al. |
| 4,696,319 A | | 9/1987 | Gant |
| 4,830,461 A | * | 5/1989 | Ishiharada et al. ............ 385/13 |
| 5,334,630 A | | 8/1994 | Francis et al. |
| 5,450,931 A | | 9/1995 | Masuda et al. |
| 5,503,777 A | | 4/1996 | Itagaki et al. |
| 5,600,109 A | | 2/1997 | Mizutani et al. |
| 6,212,151 B1 | | 4/2001 | Heanue et al. |
| 6,377,718 B1 | * | 4/2002 | Que et al. ......................... 385/3 |

FOREIGN PATENT DOCUMENTS

DE   4001704 A1 *  1/1991  ........... G01P/15/03

* cited by examiner

Primary Examiner—Frank G. Font
Assistant Examiner—Kevin Kianni
(74) Attorney, Agent, or Firm—Andrew J. Cameron; Michael A. Kagan; Peter A. Lipovsky

(57) ABSTRACT

An aspect of an electromagnetic energy wave is altered by disposing in its propagation path a material that changes optical properties in response to an acceleration force.

24 Claims, 1 Drawing Sheet

METHOD AND OPTICAL SWITCH FOR ALTERING AN ELECTROMAGNETIC ENERGY WAVE IN RESPONSE TO ACCELERATION FORCES

BACKGROUND OF THE INVENTION

The present invention is a method of altering an aspect of an electromagnetic energy wave in response to an acceleration force and more particularly to the altering of an electromagnetic energy wave, propagating in an optical switch that is responsive to an acceleration force.

Various types of acceleration responsive switches have been described in the prior art. For instance, U.S. Pat. No. 5,828,138 by McIver et al. discloses an acceleration switch wherein an inertial mass member is held in a holding position by an electrostatic force until the acceleration forces exerted upon it causes the inertial mass member to deflect to an actuated position. U.S. Pat. No. 5,600,109 by Mizutani et al. discloses an acceleration switch wherein acceleration forces cause an inertia ball to bridge one or more contacts located radially around the ball.

SUMMARY OF THE INVENTION

The present invention is a method and optical switch for altering an electromagnetic energy wave in response to an acceleration force.

The method of altering an electromagnetic energy wave in response to an acceleration force of the present invention comprises the step of disposing a material in the propagation path of the energy wave. This material changes optical properties in response to acceleration forces, such as vibration, shaking, or acceleration. The optical properties of the material change, so that the energy wave is altered.

The optical switch of the present invention comprises an electromagnetic energy source, an electromagnetic energy sensor, and a material, as described above, that changes optical properties in response to an acceleration force. The electromagnetic energy sensor is used to detect an electromagnetic energy wave that is generated by the electromagnetic energy source. The acceleration force responsive material is disposed in the propagation path of the electromagnetic energy wave, between the source and the sensor, so that when the material changes optical properties in response to an acceleration force, the electromagnetic energy wave is altered, causing the optical switch to change between an off and on condition.

The material mentioned previously is commonly referred to as "thixotropic" material. Thixotropic materials generally are materials that change from a solid state to a fluid state when exposed to acceleration forces. Typically, they are colloidal gels, which liquefy when agitated by shaking or by ultrasonic vibration and return to the gel state when at rest. Thixotropic materials further have the characteristic of changing optical properties when they change states. Some changing optical properties include an opaque material becoming transparent or a transparent material changing its index of refraction, both occurring when the material is subjected to an acceleration force. A number of thixotropic materials and additives to create thixotropic material are commercially available. King Industries markets a thixotropic material sold under the trademark Disparlon. Similarly, PPG Industries, Inc. offers synthetic precipitated silica thixotropic material sold under the trademark Hi-Sil T-600 and Hi-Sil T-700. Dow Corning sells and additive for silicone to make it thixotropic, Thixo A-300-1. RBC Industries makes available electrically conductive thixotropic materials, RBC-6200 and RBC-6400. Further information on thixotropic materials is provided in U.S. Pat. No. 5,503,777 by Itagaki et al., U.S. Pat. No. 5,334,630 by Francis et al., and U.S. Pat. No. 4,544,408 by Mosser et al.

DESCRIPTION OF THE INVENTION

Figure 1:
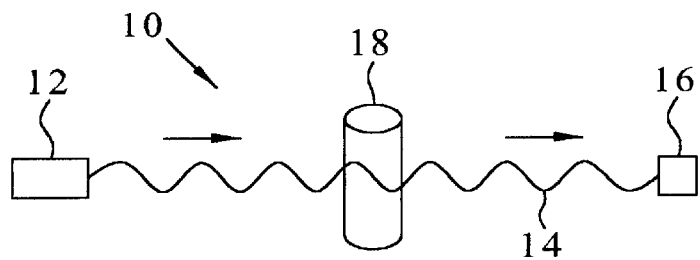
FIG. 1 is a block diagram of an ON condition of an optical switch.

FIG. 1 shows an ON condition of an optical switch 10 having ON and OFF conditions. The optical switch 10 includes an electromagnetic energy source 12 for generating an electromagnetic energy wave 14. Various devices could be employed as the electromagnetic energy source 12, such as a laser, a light emitting diode, or a lamp, for example. The optical switch 10 also includes an electromagnetic energy sensor 16 for detecting the electromagnetic energy wave 14. By way of example, electromagnetic energy sensor 16 could be a photodiode, a phototransistor, or a photoconductor, for example. The optical switch 10 further includes a material 18 that is disposed in a propagation path of the electromagnetic energy wave 14, between the electromagnetic energy source 12 and the electromagnetic energy sensor 16.

Material 18 has a first and second state, the optical properties of the material 18 being different in the second state than in the first state. By way of example, the index of refraction of the material 18 could change between the two states. Examples of how the material 18 could alter the electromagnetic energy wave 14 include, but are not limited to, reflecting, refracting, absorbing, scattering, rotating the polarization, de-polarizing, and wavelength shifting of the electromagnetic energy wave 14. Also, the material 18 could alter the electromagnetic energy wave 14 by destructing the coherence of a plurality of energy waves.

While in its first state, as shown in FIG. 1, material 18 substantially directs the electromagnetic energy wave 14 towards the electromagnetic energy sensor 16, thus allowing the electromagnetic energy sensor 16 to detect the electromagnetic energy wave 14 and keeping optical switch 10 in its ON condition. Material 18 changes to its second state when subjected to an acceleration force, such as vibration, shaking, or acceleration. While material 18 is in its second state, its optical properties are different than in its first state, such that an aspect of the electromagnetic energy wave 14 is altered and electromagnetic energy sensor 16 cannot detect electromagnetic energy wave 14, causing optical switch 10 to change to its OFF condition. Once the acceleration force is no longer present, material 18 returns to its first state, causing the optical switch 10 to return to its ON condition.

Figure 2A:
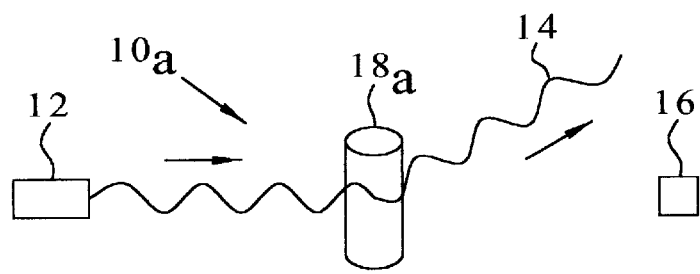
FIG. 2(a) is a block diagram of an OFF condition of an optical switch.
Figure 2B:
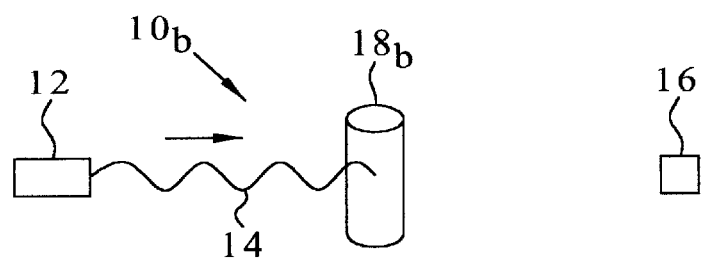
FIG. 2(b) is a block diagram of an OFF condition of another optical switch.
Figure 2C:
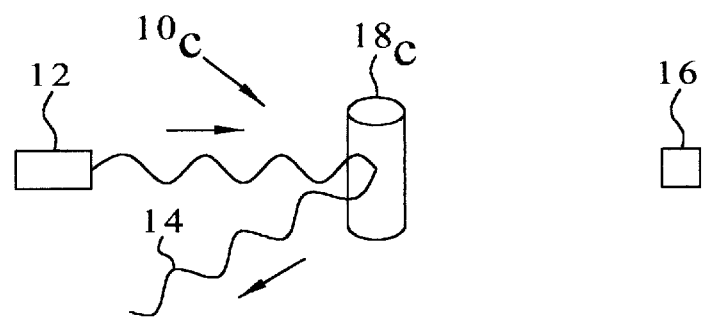
FIG. 2(c) is a block diagram of an OFF condition of yet, another optical switch.
Figure 2D:
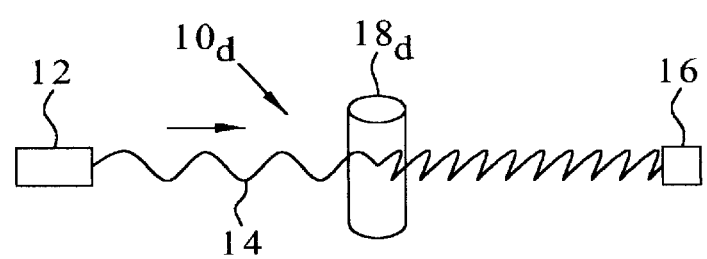
FIG. 2(d) is a block diagram of an OFF condition of another optical switch.

As stated previously, material 18 can change optical properties and alter electromagnetic energy wave 14 in different ways. For example, FIG. 2(a) shows a material 18(a) in its second state. When material 18(a) changes to its second state, it substantially refracts electromagnetic energy wave 14 away from electromagnetic energy sensor 16, causing optical switch 10(*a*) to change to its OFF condition.

FIG. 2(*b*) shows another material 18(*b*) in its second state. When material 18(*b*) changes to its second state, material 18(*b*) alters the intensity of electromagnetic energy wave 14 by substantially absorbing it, preventing electromagnetic energy sensor 16 from detecting the electromagnetic energy wave 14 and causing the optical switch 10(*b*) to change to its OFF condition.

FIG. 2(*c*) shows yet another material 18(*c*) in its second state. When material 18(*c*) changes to its second state, electromagnetic energy wave 14 is substantially reflected by the material 18(*c*), preventing electromagnetic energy sensor 16 from detecting the electromagnetic energy wave 14 and causing the optical switch 10(*c*) to change to its OFF condition.

Another material 18(*d*) may be employed in optical switch 10(*d*) as shown in FIG. 2(*d*). When material 18*d* changes to its second state, the polarization of electromagnetic energy wave 14 is substantially altered, such that electromagnetic energy sensor 16 detects this change and causes the optical switch 10 to change to its OFF condition.

As an alternative to the embodiments listed above, optical switch 10 could be employed in a reverse manner. That is, having material 18 alter an aspect of electromagnetic energy wave 14, so that electromagnetic energy sensor 16 does not detect the electromagnetic energy wave 14, while material 18 is in its first state. When material 18 is then subjected to an acceleration force, material 18 would change to its second state and allow electromagnetic energy sensor 16 to detect electromagnetic energy wave 14 and thus, change the condition of the optical switch.

We claim:

1. A method of altering an aspect of an electromagnetic energy wave in response to an acceleration force, said method comprising the step of interposing in a propagation path of said electromagnetic energy wave, a material that changes from a solid state to a liquid state in response to said acceleration force, and changes back to said solid state in absence of said acceleration force, the optical properties of said material in said liquid state being different than the optical properties in said solid state, such that said change from one of said states to the other said state results in altering said aspect of said electromagnetic energy wave.

2. The method of altering an aspect of an electromagnetic energy wave as recited in claim 1 wherein said material alters said propagation path of said energy wave when said material changes between said states.

3. The method of altering an aspect of an electromagnetic energy wave as recited in claim 2 wherein said material substantially reflects said energy wave when said material changes from one of its said states to the other.

4. The method of altering an aspect of an electromagnetic energy wave as recited in claim 2 wherein said material substantially refracts said energy wave when said material changes between said states.

5. The method of altering an aspect of an electromagnetic energy wave as recited in claim 1 wherein said material alters the intensity of said energy wave when said material changes between said states.

6. The method of altering an aspect of an electromagnetic energy wave as recited in claim 1 wherein said material alters the polarization of said energy wave when said material changes between said states.

7. An optical switch, having an on condition and an off condition, comprising:

(a) an electromagnetic energy source for generating a electromagnetic energy wave;

(b) an electromagnetic energy sensor for detecting said electromagnetic energy wave;

(c) a material disposed in the propagation path of said electromagnetic energy wave between said electromagnetic energy source and said electromagnetic energy sensor, for altering an aspect of said energy wave by changing from a solid state to a liquid state in response to an acceleration force, and by changing back to said solid state in the absence of said acceleration force, the optical properties of said material in said liquid state being different than the optical properties in said solid state, such that said altering of said energy wave aspect results in said switch changing between said conditions.

8. The optical switch as recited in claim 7 wherein said material alters said propagation path when said material changes between said states.

9. The optical switch as recited in claim 8 wherein said material substantially reflects said energy wave when said material changes from one of its said states to the other.

10. The optical switch as recited in claim 8 wherein said material substantially refracts said energy wave when said material changes between said states.

11. The optical switch as recited in claim 7 wherein said material alters the polarization of said energy wave when said material changes between said states.

12. The optical switch as recited in claim 7 wherein said material alters the intensity of said energy wave when said material changes between said states.

13. The optical switch as recited in claim 7 wherein said electromagnetic energy source is a light source.

14. The optical switch as recited in claim 13 wherein said light source is a laser.

15. The optical switch as recited in claim 13 wherein said light source is a light emitting diode.

16. The optical switch as recited in claim 13 wherein said light source is a lamp.

17. The optical switch as recited in claim 7 wherein said electromagnetic energy sensor is a light sensor.

18. The optical switch as recited in claim 17 wherein said light sensor is a photodiode.

19. The optical switch as recited in claim 17 wherein said light sensor is a phototransistor.

20. In an acceleration responsive optical switch having an electromagnetic energy wave source and an electromagnetic energy wave sensor, an improvement comprising a material disposed in a propagation path of an electromagnetic energy wave between said electromagnetic energy source and said electromagnetic energy wave sensor, for altering an aspect of said energy wave by changing from a solid state to a liquid state in response to an acceleration force, and by changing back to said solid state in the absence of said acceleration force, the index of refraction of said material in said liquid state being different than the index of refraction of said material in said solid state.

21. The improvement as recited in claim 20 wherein said material alters said propagation path of said electromagnetic energy wave when said material changes between said states.

22. The improvement as recited in claim 21 wherein said material substantially reflects said electromagnetic energy wave when said material changes from said solid to said liquid state.

23. The improvement as recited in claim 21 wherein said material substantially refracts said electromagnetic energy wave when said material changes between said states.

24. The improvement as recited in claim 20 wherein said material alters the intensity of said electromagnetic energy wave when said material changes between said states.

* * * * *